United States Patent [19]

Suzuki et al.

[11] Patent Number: 4,689,390

[45] Date of Patent: Aug. 25, 1987

[54] CURABLE EPOXY RESIN COMPOSITION

[75] Inventors: Hiroshi Suzuki; Yutaka Asakawa; Akira Matsui, all of Tokyo, Japan

[73] Assignees: Asahi Denka Kogyo K.K.; A.C.R. Co., Ltd., both of Tokyo, Japan

[21] Appl. No.: 840,293

[22] Filed: Mar. 14, 1986

[30] Foreign Application Priority Data

Apr. 1, 1985 [JP] Japan .................................. 60-68651
Apr. 12, 1985 [JP] Japan .................................. 60-77792
Dec. 20, 1985 [JP] Japan .................................. 60-287519

[51] Int. Cl.$^4$ ............................................. C08G 59/50
[52] U.S. Cl. ..................................... 528/118; 528/98; 528/104; 528/121
[58] Field of Search ............... 525/396, 484, 486, 526; 528/118, 121, 104, 98

[56] References Cited

U.S. PATENT DOCUMENTS 2,965,609 12/1960 Newey .................................. 528/118
3,321,438 5/1967 Brooker et al. ...................... 528/118
3,496,130 2/1970 Wasem et al. ....................... 525/526

*Primary Examiner*—Veronica P. Hoke
*Attorney, Agent, or Firm*—Flynn, Thiel, Boutell & Tanis

[57] ABSTRACT

A thermosetting epoxy resin composition of one pack type is provided which contains as indispensable constituents (I) an epoxy resin containing more than one adjacent epoxy groups on the average in the molecule and (II) a curing amount or curing-accelerating amount of a compound obtained by reacting (a) a specified amine/epoxy adduct with (b) phenolic resin(s) and/or polyhydric phenol compound(s) in a weight ratio of (a) to (b) of 1/0.1 to 1/0.8. The composition of the present invention has excellent storage stability and it is curable at a relatively low temperature to form a cured product having excellent mechanical strength, adhesiveness and water resistance.

6 Claims, No Drawings

CURABLE EPOXY RESIN COMPOSITION

BACKGROUND OF THE INVENTION

1. Field of the Invention

The present invention relates to a curable epoxy resin composition. More particularly, the invention relates to a one-pack, thermosetting epoxy resin composition having an excellent storage stability and curable at a relatively low temperature in a short time.

Further, the present invention relates to a curable epoxy resin composition containing a curing agent highly compatible with an ordinary epoxy resin to form a cured product having excellent mechanical strength, adhesiveness and water resistance.

2. Prior Art

The development of a latent curing epoxy resin composition of one-pack type usable as an adhesive for structural materials has been demanded. In processes proposed heretofore, an imidazole compound or its salt with an acid is used as a curing agent.

However, the conventional curing epoxy resin compositions of one-pack type have problems that heating at a high temperature for a long time is required and that the storage stability thereof is yet unsatisfactory, since the curing reaction proceeds at room temperature due to their insufficient latentness even though they can be cured at a relatively low temperature. The shelf life of them is usually only about 10 to 20 days at room temperature. Under these circumstances, an improvement has been demanded.

Another defect is that when they are cured at a relatively low temperature in a short time, the cured product has a quite low peeling strength.

To overcome these defects, a curing agent comprising a dialkylamine to which an epoxy resin is added is disclosed in the specifications of Japanese Patent Laid-Open Nos. 155222/1981 and 100127/1982 and a curing agent comprising an amino alcohol or aminophenol to which an epoxy resin is added is disclosed in the specification of Japanese Laid-Open No. 53526/1984.

However, when the above-mentioned curing agents are used, the compatibility thereof with the epoxy resin is poor and it is difficult to control the balance among heat resistance, flexibility and adhesiveness of the obtained cured product, since no active hydrogen of the amino group is contained in the molecule.

SUMMARY OF THE INVENTION

An object of the present invention is to provide a curable epoxy resin composition of one-pack type containing a curing agent having a high compatibility with the epoxy resin and capable of curing at a relatively low temperature in a short time to form a cured product having excellent mechanical strength, particularly adhesiveness, heat resistance, flexibility and storage stability, wherein the control of the balance among these properties is easy.

DETAILED DESCRIPTION OF THE INVENTION

The curable epoxy resin composition of the present invention comprises as indispensable constituents:

(I) an epoxy resin having more than one adjacent epoxy groups on the average in the molecule, and (II) a curing amount or curing-accelerating amount of a compound obtained by reacting 1 part by weight of the following amine/epoxy adduct (a) with 0.1 to 0.8 part by weight of the following compound(s) (b):

(a) an amine/epoxy adduct (a) obtained by reacting an amino compound (1) of the general formula:

wherein $R_1$ and $R_2$ represent each an alkyl group having 1 to 5 carbon atoms and X represents an alkylene group having 1 to 5 carbon atoms, or an amino compound mixture comprising said amino compound (1) and 1-amino-4-ethylpiperazine (2) in a weight ratio of (1) to (2) of 70/30 to 99/1 with an epoxy resin (3) having more than one adjacent epoxy groups/on the average in the molecule in such a ratio that the amount of the epoxy groups in the epoxy resin (3) will be 0.8 to 2.5 equivalents per equivalent of the amino group in the amino compound(s) [(1) or (1)+(2)], and (b) at least one compound (b) selected from the group consisting of phenolic resins and polyhydric phenol compounds.

The epoxy resins (I) which can be used in this invention include, for example, an epoxy compound which contains on the average more than one 1,2-epoxy group (preferably an epoxy compound which contains on the average 2 or more groups), epoxidized polyunsaturated compounds and other well known epoxy compounds which contain an adjacent epoxy group.

The epoxy resin (I) which may be used in the compositions of this invention include, for example, epoxy compounds (I-1) containing on the average more than one substituted glycidyl ether group which is represented by the general formula:

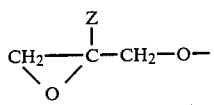

(wherein Z represents a hydrogen atom, a methyl group or an ethyl group) per molecule; epoxy compounds (I-2) containing on the average more than one substituted or nonsubstituted glycidyl ester group which is represented by the general formula:

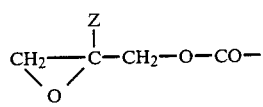

(wherein Z represents a hydrogen atom, a methyl group or an ethyl group) per molecule; and epoxy compounds (I-3) containing on the average more than one substituted or nonsubstituted N-substituted glycidyl group which is represented by the general formula:

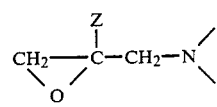

(wherein Z represents a hydrogen atom, a methyl group or an ethyl group) per molecule.

Said epoxy compounds (I-1) containing on the average more than one substituted or non-substituted glycidyl ether group per molecule may be prepared by glycidyletherifying hydroxy compounds such as phenolic hydroxyl compounds or alcoholic hydroxyl compounds.

Examples of the preferable epoxy compounds (I-1) include, for example, polyglycidyl ethers (i-1-1) of polyhydric phenols containing one or more aromatic nuclei, polyglycidyl ethers (i-1-2) of alcoholic polyhydroxyl compounds derived by the addition reaction of polyhydric phenols containing one or more aromatic nuclei with alkylene oxides containing 2 to 4 carbon atoms, and polyglycidyl ethers (I-1-3) of alcoholic polyhydroxyl compounds containing one or more alicyclic rings.

Said polyhydric phenol polyglycidyl ethers (I-1-1) include, for example, epoxide compounds containing, as the main reaction product, (1) polyglycidyl ethers obtained by reacting polyhydric phenols (D) containing at least one aromatic nucleus with epihalohydrins (e) in the presence of basic catalysts or basic compounds, such as sodium hydroxide, (2) epoxide compounds obtained by reacting polyhalohydrin ethers, obtained by reacting polyhydric phenols (D) containing at least one aromatic nucleus with epihalohydrins (e) in the presence of catalytic amounts of acid catalysts such as boron trifluoride, with basic compounds such as sodium hydroxide, and (3) epoxide compounds obtained by reacting polyhalohydrin ethers, obtained by reacting polyhydric phenols (D) containing at least one aromatic nucleus with epihalohydrins (e) in the presence of catalytic amounts of basic catalysts such as triethyl amine, with basic compounds such as sodium hydroxide.

Such polyoxyalkylated polyhydric phenol polyglycidyl ethers (I-1-2) include, for example, epoxide compounds containing, as the main reaction product, polyglycidyl ethers obtained by reacting polyhalohydrin ethers, obtained by reacting polyoxyalkylated polyhydric phenols (E) derived by the addition reaction of polyhydric phenols containing at least one aromatic nucleus with alkylene oxides containing 2 to 4 carbon atoms, with epihalohydrins (e) in the presence of a catalytic amount of acid catalyst such as boron trifluoride, with basic compounds such as sodium hydroxide.

Said polyhydric phenols containing at least one aromatic nucleus (D) include polyhydric mononuclear phenols containing one aromatic nucleus (D-1), and polyhydric polynuclear phenols containing at least two aromatic nuclei (D-2).

Illustrative polyhydric mononuclear phenols (D-1), include, for example, resorcinol, hydroquinone, pyrocatechol, phloroglucinol, 1,5-dihydroxy naphthalene, 2,7-dihydroxy naphthalene, 2,6-dihydroxy naphthalene and the like.

Illustrative polyhydric polynuclear phenols (D-2) include dihydric polynuclear phenols having the following general formula;

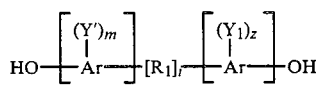
(2)

wherein: Ar is an aromatic divalent hydrocarbon group or radical such as naphthylene and phenylene, with phenylene being preferred for purposes of this invention; Y' and $Y_1$, which can be the same or different, are alkyl groups such as methyl, n-propyl, n-butyl, n-hexyl, n-octyl and the like, preferably alkyl groups having a maximum of 4 carbon atoms, or halogen atoms, i.e., chlorine, bromine, iodine, or fluorine, or alkoxy groups such as methoxy, methoxymethyl, ethoxy, ethoxyethyl, n-butoxy, amyloxy and the like, preferably an alkoxy group having a maximum of 4 carbon atoms (it is to be understood that whenever there are substituents exclusive of the hydroxyl groups on either or both of the aromatic divalent hydrocarbon groups, that these substituents can be the same or different); i is an integer having a value of 0 or 1; m and z are integers having a value of from 0 to a maximum value corresponding to the number of hydrogen atoms on the aromatic ring (Ar) which can be replaced by substituents and can have the same or different values; and $R_1$ is a divalent group or radical, as for example

or —O—, or —S—, or —SO—, or —SO$_2$—, or a divalent hydrocarbon group as, for example, an alkylene group such as methylene, ethylene, trimethylene, tetramethylene, pentamethylene, hexamethylene, 2-ethyl hexamethylene, octamethylene, nonamethylene, decamethylene, and the like, an alkylidene group such as ethylidene, propylidene, isopropylidene, isobutylidene, amylidene, isoamylidene, 1-phenyl ethylidene and the like, or a cycloaliphatic group, such as 1,4-cyclohexylene, 1,3-cyclohexylene, cyclohexylidene and the like, or halogenated alkylidene, alkylene or cycloaliphatic groups, alkoxy and aryloxy substituted alkylidene, alkylene or cycloaliphatic groups, such as methoxy methylene, ethoxy methylene, ethoxy ethylene, 2-ethoxy trimethylene, 3-ethoxy pentamethylene, 1,4-(2-methoxycyclohexane), phenoxy ethylene, 2-phenoxy trimethylene, 1,3-(2-phenoxy cyclohexane), and the like, aralkylene groups, such as phenyl ethylene, 2-phenyl trimethylene, 1-phenyl pentamethylene, 2-phenyl decamethylene, and the like, aromatic groups, such as phenylene, naphthylene, and the like, halogenated aromatic groups, such as 1,4-(2-chlorophenylene), 1,4-(2-bromophenylene), 1,4-(2-fluorophenylene), and the like; alkoxy and aryloxy substituted aromatic groups, such as 1,4-(2-methoxyphenylene), 1,4-(2-ethoxyphenylene), 1,4-(2-n-propoxyphenylene), 1,4-(2-phenoxyphenylene), and the like, alkyl substituted aromatic groups, such as 1,4-(2-methylphenylene), 1,4-(2-ethylphenylene), 1,4-(2-n-propylphenylene), 1,4-(2-n-butylphenylene), 1,4-(2-n-dodecylphenylene) and the like, or $R_1$ can be a ring which is fused to one of the Ar groups as is the case, for example, in the compound having the formula:

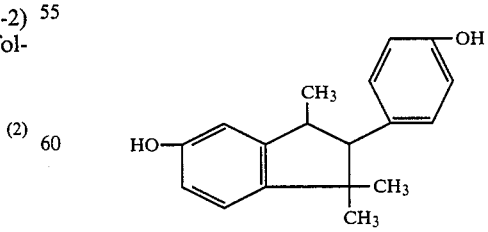

or $R_1$ can be a polyalkoxy group such as polyethoxy, polypropoxy, polythioethoxy, polybutoxy, polyphenylethoxy, or $R_1$ can be a group containing a silicon atom as, for example, polydimethylsiloxy, polydiphenylsiloxy, polymethylphenylsiloxy and the like, or $R_1$ can be two or more alkylene or alkylidene groups separated by an aromatic ring, a tertiary amino group, an ether linkage, a carbonyl group or separated by a linkage containing sulfur such as sulfur, sulfoxide and the like.

Particulary preferred as the dihydric polynuclear phenols are compounds having the general formula:

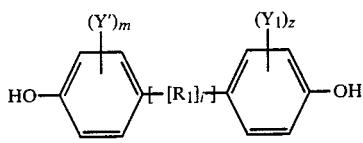 (2-1)

wherein Y', and $Y_1$ and i are as previously defined, m and z have values of from 0 to 4 inclusive and $R_1$ is an alkylene or alkylidene group, preferably having from 1 to 3 carbon atoms inclusive, or $R_1$ is phenylene group having the formula:

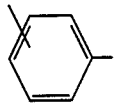

or $R_1$ is a saturated group having the formula:

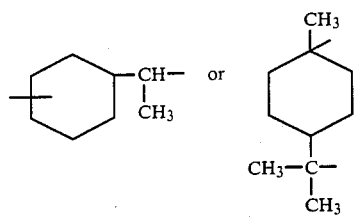

Examples of specific dihydric phenols include among others the bis-(hydroxyphenyl)-alkanes such as 2,2-bis-(p-hydroxyphenyl)-propane, commonly referred to as bisphenol-A, 2,4'-dihydroxy diphenylmethane, bis-(2-hydroxyphenyl)methane, bis-(4-hydroxyphenyl)methane, bis-(4-hydroxy-2,6-dimethyl-3-methoxyphenyl)methane, 1,1-bis-(4-hydroxyphenyl)ethane, 1,2-bis-(4-hydroxyphenyl)-ethane, 1,1-bis-(4-hydroxy-2-chlorophenyl)-ethane, 1,1-bis-(3,5-dimethyl-4-hydroxyphenyl)ethane, 1,3-bis-(3-methyl-4-hydroxyphenyl)-propane, 2,2-bis-(3-phenyl-4-hydroxyphenyl)-propane, 2,2-bis-(3-isopropyl-4-hydroxyphenyl)-propane, 2,2-bis-(2-isopropyl-4-hydroxyphenyl)propane, 2,2-bis-(4-hydroxynaphthyl)-propane, 2,2-bis-(4-hydroxyphenyl)-pentane, 3,3-bis-(4-hydroxyphenyl)-pentane, 3,3-bis-(4-hydroxyphenyl)-heptane, bis-(4-hydroxyphenyl)-phenylmethane, bis-(4-hydroxyphenyl)-cyclohexylmethane, 1,2-bis-(4-hydroxyphenyl)-1,2-bis-(phenyl)-propane, 2,2-bis-(4-hydroxyphenyl)-1-phenylpropane and the like; dihydroxybiphenyls such as 4,4-dihydroxybiphenyl, 2,2'-dihydroxybiphenyl, 2,4-dihydroxybiphenyl and the like; di(hydroxyphenyl)-sulfones such as bis-(4-hydroxyphenyl)-sulfone, 2,4'-dihydroxydiphenyl sulfone, 5'-chloro-2,4'-di-hydroxydiphenyl sulfone, 5'-chloro-4,4'-dihydroxydiphenyl sulfone, 3'-chloro-4,4'-dihydroxy diphenyl sulfone and the like; di(hydroxyphenyl)-ethers such as bis-(4-hydroxyphenyl)ether, the 4,3'-, 4,2'-, 2,2'-, 2,3'-, di-hydroxydiphenyl ethers, 4,4'-dihydroxy-2,6-dimethyldiphenyl ether, bis-(4-hydroxy-3-isobutylphenyl)-ether, bis-(4-hydroxy-3-isopropylphenyl)-ether, bis-(4-hydroxy-3-chlorophenyl)-ether, bis-(4-hydroxy-3-fluorophenyl)-ether, bis-(4-hydroxy-3-bromophenyl)-ether, bis-(4-hydroxynaphthyl)-ether, bis-(4-hydroxy-3-chloronaphthyl)-ether, bis-(2-hydroxybiphenyl)-ether, 4,4'-dihydroxy-2,6-dimethoxydiphenyl ether, 4,4'-dihydroxy-2,5-diethoxydiphenyl ether, and the like; also suitable are 1,1-bis-(4-hydroxyphenyl)-2-phenylethane, 1,3,3'-trimethyl-1-(4-hydroxyphenyl)-6-hydroxyindane, 2,4-bis-(p-hydroxyphenyl)-4-methylpentane and the like.

Other examples of dihydric dinuclear phenols are biphenols such as 4,4'-dihydroxy biphenyl, 3-methyl-4,4'-dihydroxy biphenyl, octachloro-4,4'-dihydroxy biphenyl and the like.

Also preferred are other dihydric polynuclear phenols having the general formula:

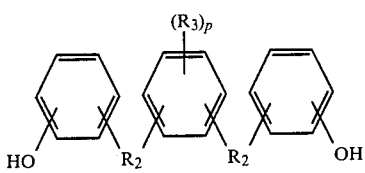 (2-2)

wherein $R_3$ is a methyl or ethyl group, $R_2$ is an alkylidene or other alkylene having from 1 to 9 carbon atoms, and p ranges from zero to 4. Examples of dihydric polynuclear phenols having the formula (2-2) include 1,4-bis-(4-hydroxybenzyl)-benzene, 1,4-bis-(4-hydroxybenzyl)tetramethylbenzene, 1,4-bis-(4-hydroxybenzyl)tetraethylbenzene, 1,4-bis-(p-hydroxycumyl)-benzene, 1,3-bis(p-hydroxycumyl)-benzene and like.

Other examples of polyhydric polynuclear phenols (D-2) include, for example, pre-condensation products of phenols with carbonyl compounds, (for example, pre-condensation products of phenol resin, condensation products of phenols with acroleins, condensation products of phenols with glyoxal, condensation products of phenols with pentanediol, condensation products of resorcinols with acetone, and pre-condensation products of xylenes-phenols with formalin), and condensation products of phenols with polychloromethylated aromatic compounds (for example, condensation products of phenols with bischloromethylxylene).

The polyoxyalkylated polyhydric phenols (E) are compounds which are obtained by reacting the above-mentioned polyhydric phenols (D) having at least one aromatic nucleus with an alkylene oxide in the presence of such catalysts as will accelerate the reaction of the OH group and the epoxy group and which has atomic groups of —ROH (wherein R is an alkylene group derived from an alkylene oxide) and/or —(RO)$_n$H (wherein R is an alkylene group derived from an alkylene oxide, one polyoxyalkylene chain may contain different alkylene groups and n is an integer of 2 or more indicating the number of polymerized oxyalkylene groups) bonded with said phenol residue by an ether bond. In this case, the ratio of alkylene oxide to said polyhydric phenyl (D) is made more than 1:1 (mol:mol). But, preferably, the ratio of the alkylene oxide to the OH group of said polyhydric phenol (D) is 1 to 10:1 or particularly 1 to 3:1 by equivalents.

Said alkylene oxides include, for example, ethylene oxide, propylene oxide and butylene oxide, and particularly preferred are those which will bring forth branched chains in the case of producing ether linkages by their reaction with polyhydric phenols. Preferable examples thereof include propylene oxide and 2,3-butylene oxide, and a particularly preferable example thereof is propylene oxide.

Particularly preferred among the polyoxyalkylated polyhydric phenols (E) are those having the following general formula:

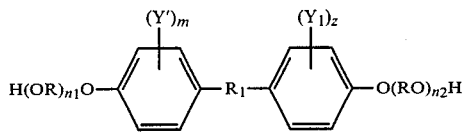

wherein Y', $Y_1$, m, z and $R_1$ have the same significance as defined for the general formula (2-1), R is an alkylene group containing 2 to 4 carbon atoms, and $n_1$ and $n_2$ range from 1 to 3.

In addition, preferred among the polyoxyalkylated polyhydric phenols (E) are those having the following general formula:

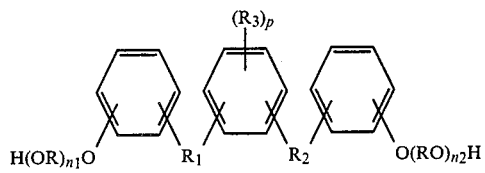

wherein $R_1$, $R_2$, $R_3$, and p have the same significance as defined for the general formulas (2-1) and (2-2), R is an alkylene group containing 2 to 4 carbon atoms, and $n_1$ and $n_2$ range from 1 to 3.

Further, as epoxy compounds (I-2) having an average of more than one substituted or nonsubstituted glycidyl ester group in the molecule, there are polyglycidyl esters of aliphatic polycarboxylic acids or aromatic polycarboxylic acids. For example, there is included an epoxy resin such as is obtained by polymerizing glycidyl methacrylate synthesized from an epihalohydrin (e) represented by the below-mentioned general formula (4) and methacrylic acid.

Further, as examples of epoxy compounds (I-3) having an average of more than one substituted or nonsubstituted N-substituted glycidyl group in the molecule, there can be enumerated epoxy resins obtained from aromatic amines (for example, aniline or aniline having alkyl substituent(s) in the nucleus) and epihalohydrins (e) represented by the below-mentioned general formula (4) and epoxy resins obtained from precondensates of aromatic amines and aldehydes (for example, aniline-formaldehyde precondensates or aniline-phenol-formaldehyde precondensates) and epihalohydrins (e).

Said polyhydric alicyclic alcohol polyglycidyl ethers (I-1-3) include, for example, epoxide compounds containing, as the main reaction product, polyglycidyl ethers obtained by reacting polyhydric alcohols (F) containing at least one alicyclic ring with epihalohydrins (e) in the presence of basic catalysts or basic compounds, such as sodium hydroxide, epoxide compounds obtained by reacting polyhalohydrin ethers, obtained by reacting polyhydric alcohols (F) containing at least one alicyclic ring with epihalohydrins (e) in the presence of catalytic amounts of acid catalysts such as boron trifluoride, with basic compounds such as sodium hydroxide, and epoxide compounds obtained by reacting polyhalohydrin ethers, obtained by reacting polyhydric alcohols (F) containing at least one alicyclic ring with epihalohydrins (e) in the presence of catalytic amounts of basic catalysts such as triethyl amine, with basic compounds such as sodium hydroxide.

Similarly such polyglycidyl ethers (I-1-3) include, for example, epoxide compounds containing, as the main reaction product, polyglycidyl ethers obtained by reacting polyhalohydrin ethers, obtained by reacting polyhydroxyl compounds (G) derived by the addition reaction of polyhydric alcohols (F) containing at least one alicyclic ring with alkylene oxides containing 2 to 4 carbon atoms, with epihalohydrins (e) in the presence of catalytic amounts of acid catalysts such as boron trifluoride, with basic compounds such as sodium hydroxide.

Preferred examples of polyglycidyl ether (I-1-3) are polyglycidyl ethers derived from polyhydric alcohols containing at least one alicyclic ring and polyglycidyl ethers derived by an addition reaction of polyhydric alcohols containing at least one alicyclic ring with an alkylene oxide containing 2 to 4 carbon atoms.

Said polyglycidyl ethers (I-1-3) can be prepared by the hydrogenation of aromatic rings of epoxide resins derived from polyhydric phenols containing at least one aromatic ring, such as polyglycidylethers of polyhydric phenols, to alicyclic rings, in which reaction usable catalysts are, for example, rhodium or ruthenium supported on a carrier, which are described in Japanese Patent Publication 42-7788 (7788/1967).

Said polyhydric alcohols containing at least one alicyclic ring (F) include polyhydric mononuclear alcohols containing one alicyclic ring (F-1), and polyhydric polynuclear alcohols containing at least two alicyclic rings (F-2).

Preferably polyhydric mononuclear alcohols (F-1) include dihydric mononuclear alcohols having the following formula (3):

$$HO-(R_4)_f-A-(R_5)_g-OH \qquad (3)$$

wherein A represents a divalent cyclohexyl group which may be substituted by alkyl groups, such as methyl, n-propyl, n-butyl, n-hexyl, n-octyl and the like, preferably alkyl groups having a maximum of 4 carbon atoms, or halogen atom, i.e., chlorine, bromine, or fluorine, or alkoxy groups such as methoxy, methoxymethyl, ethoxy, ethoxyethyl, n-butoxy, amyloxy and the like, preferably an alkoxy group having a maximum of 4 carbon atoms, preferably nonsubstituted or substituted with halogen atoms, in view of properties of flame-resistance. $R_4$ and $R_5$, which can be the same or different, are alkylene groups such as methylene, n-propylene, n-butylene, n-hexylene, n-octylene and the like, preferably alkylene groups having a maximum of 6 carbon atoms; f and g, which can be the same or different, are 0 or 1, preferably 0.

Illustrative dihydric monocyclic alcohols having one cyclohexyl ring are, for example, substituted or nonsubstituted cyclohexanediols such as 1,4-cyclohexanediol, 2-methyl-1,4-cyclohexanediol, 2-chloro-1,4-cyclohexanediol, 1,3-cyclohexanediol, and the like, substituted or non-substituted dihydroxyalkylcyclohexane such as 1,4-dihydroxymethylcyclohexane, 1,4-dihydroxyethylcyclohexane, 1,3-dihydroxyethylcyclohexane, 1,4-dihydroxypropylcyclohexane, 1,4-dihydroxybutylcyclohexane and the like.

Further, polyhydric mononuclear alcohols having one alicyclic ring, except a cyclohexyl ring, can be substituted or nonsubstituted cycloalkylpolyols, such as 1,3-cyclopentanediol, 1,4-cycloheptanediol, 1,3- cycloheptanediol, 1,5-perhydronaphthalenediol, 1,3-dihydroxy-2,2,4,4-tetramethylcyclobutane, 2,6-dihydroxygecahydronaphthalene, 2,7-dihydroxydecahydronaphthalene, 1,5-dihydroxydecahydronaphthalene and the like, and substituted or nonsubstituted polyhydroxyalkyl cycloalkanes such as 1,3-dihydroxymethylcyclopentane, 1,4-dihydroxymethylcycloheptane, 2,6-bis(hydroxymethyl)decahydronaphthalene, 2,7-bis(hydroxymethyl)-decahydronaphthalene, 1,5-bis(hydroxymethyl)-decahydronaphthalene, 1,4-bis(hydroxymethyl)-decahydronaphthalene, 1,4-bis(hydromethyl)-bicyclo[2,2,2]-octane and dimethyloltricyclodecane.

Particularly preferred, by reason of economy, as the polyhydric monocyclic alcohol is 1,4-dihydroxymethylcyclohexane.

Further, polyhydric polycyclic alcohols (F-2), for example, include polyhydric polycyclic alcohols having the following general formula (4):

$$HO-(R_2)_f-(A_1)_k-[(R_1)_j-(A_2)_l]_i-(R_3)_g-OH \quad (4)$$

wherein: $A_1$ and $A_2$ are mono-ring or poly-ring divalent alicyclic hydrocarbon groups which may be substituted by alkyl groups, such as methyl, n-propyl, n-butyl, n-hexyl, n-octyl and the like (preferably alkyl groups having a maximum of 4 carbon atoms), or halogen atoms, i.e., chlorine, bromine, or fluorine, or alkoxy groups such as methoxy, methoxymethyl, ethoxy, ethoxyethyl, n-butoxy, amyloxy and the like (preferably alkoxy groups having a maximum of 4 carbon atoms), or may be unsubstituted, preferably, $A_1$ and $A_2$ are nonsubstituted or substituted by halogen atoms in view of properties of flame-resistance; k and l are 0 or 1, except that k and l are 0 together, $R_1$ has the same significance as defined for the general formula (1), preferably methylene group, ethylene group or isopropylene group in view of properties of flame-resistance: j is 0 or 1; $R_2$ and $R_3$, which can be the same or different, are alkyl groups such as methyl, n-propyl, n-butyl, n-hexyl, n-octyl and the like, preferably alkyl groups having a maximum of 6 carbon atoms; f and g are 0 or 1, preferably 0, and i is an integer 0 more than 0, preferably 0 or 1.

Particularly preferably polyhydric polycyclic alcohols (F-2) are dihydric polycyclic alcohols having the following general formula (4-1):

$$HO-A_1-(R_1)_j-A_2-OH \quad (4-1)$$

wherein: $A_1$, $A_2$, $R_1$ and j have the same significance as defined for the general formula (4).

Preferably examples of such dihydric polycyclic alcohols are substituted or nonsubstituted bicyclo alkanediols such as 4,4'-bicyclohexanediol, 3,3'-bicyclohexanediol, octachloro-4,4'-bicyclohexanediol and the like, or bis-(hydroxycycloalkyl)-alkanes such as 2,2-bis-(4-hydroxycyclohexyl)-propane, 2,4'-dihydroxydicyclohexylmethane, bis-(2-hydroxycyclohexyl)methane, bis-(4-hydroxycyclohexyl)-methane, bis-(4-hydroxy-2,6-dimethyl-3-methoxycyclohexyl)-methane, 1,1-bis-(4-hydroxycyclohexyl)-ethane, 1,1-bis-(4-hydroxycyclohexyl)-propane, 1,1-bis-(4-hydroxycyclohexyl)-butane, 1,1-bis-(4-hydroxycyclohexyl)-pentane, 2,2-bis-(4-hydroxycyclohexyl)-butane, 2,2-bis-(4-hydroxycyclohexyl)-pentane, 3,3-bis-(4-hydroxycyclohexyl)-pentane, 2,2-bis-(4-hydroxycyclohexyl)-heptane, bis-(4-hydroxycyclohexyl)-phenylmethane, bis-(4,4-hydroxycyclohexyl)-cyclohexylmethane, 1,2-bis-(4-hydroxycyclohexyl)-1,2-bis-(phenyl)-propane, 2,2-bis-(4-hydroxycyclohexyl)-1-phenylpropane, 2,2-bis-(4-hydroxycyclohexyl)-1-phenylpropane, 2,2-bis-(4-hydroxy-3-methylcyclohexyl)propane, 2,2-bis-(4-hydroxy-2-methyl-cyclohexyl)-propane, 1,2-bis-(4-hydroxycyclohexyl)ethane, 1,1-bis-(4-hydroxy-2-chlorocyclohexyl)ethane, 1,1-bis-(3,5-dimethyl-4-hydroxycyclohexyl)ethane, 1,3-bis-(3-methyl-4-hydroxycyclohexyl)propane, 2,2-bis-(3,5-dichloro-4-hydroxycyclohexyl)propane, 2,2-bis-(3-phenyl-4-hydroxycyclohexyl)-propane, 2,2-bis-(3-isopropyl-4-hydroxycyclohexyl)-propane, 2,2-bis-(2-isopropyl-4-hydroxycyclohexyl)-propane, 2,2-bis-(4-hydroxyperhydronaphthyl)propane, and the like, dihydroxycycloalkanes such as 4,4'-dihydroxydicyclohexane, 2,2-dihydroxybicyclohexane, 2,4-dihydroxybicyclohexane, and the like, di-(hydrocycloalkyl)-sulfones such as bis-(4-hydroxycyclohexyl)-sulfone, 2,4'-dihydroxy-dicyclohexylsulfone, 5-chloro-2,4-dihydroxydicyclohexylsulfone, 5-chloro-4,4'-dihydroxydicyclohexylsulfone, 3'-chloro-4,4'-dihydrocyclohexylsulfone and the like, di-(hydroxycycloalkyl)ether such as bis-(4-hydroxycyclohexyl)ether, 4,3'-(or 4,2'-, 2,2'- or 2,3'-)dihydroxydicyclohexylether, 4,4'-dihydroxy-2,6-dimethyldicyclohexylether, bis-(4-hydroxy-3-isobutylcyclohexyl)ether, bis-(4-hydroxy-3-isopropylcyclohexyl)ether, bis-(4-hydro-3-chlorocyclohexyl)ether, bis-(4-hydroxy-3-fluorocyclohexyl)ether, bis-(4-hydroxy-3-bromocyclohexyl)ether, bis-(4-hydroxy-3-hydroxy-perhydronaphthyl)ether, bis-(4-hydroxy-3-chloro-perhydronaphthyl)ether, bis-(2-hydroxybicyclohexyl)ether, 4,4'-dihydroxy-2,6-dimethoxydicyclohexylether, 4,4'-dihydroxy-2,5-diethoxydicyclohexylether, and the like, 1,1-bis-(4-hydroxycyclohexyl)-2-phenyethane, 1,3,3-trimethyl--1-(4-hydroxycyclohexyl)-6-hydroxyindane, 2,4-bis-(p-hydroxycyclohexyl)-4-methylpentane.

A preferable group of such dihydric polycyclic alcohols are compounds having the following general formula (4-2):

$$HO-A_1-(R_1)_j-A_2-(R_1)_j-A_2-OH \quad (4-2)$$

wherein: $A_1$, $A_2$, $R_1$ and j have the same significance as defined for the general formula (4) and two $R_1$, two j and two $A_2$ are the same or different each other.

Examples of such dihydric polycyclic alcohols are 1,4-bis(4-hydroxycyclohexylmethyl)-cyclohexane, 1,4-bis(4-hydroxy-cyclohexylmethyl)-tetramethylcyclohexane, 1,4-bis(4-hydroxycyclohexylmethyl)-tetraethylcyclohexane, 1,4-bis(p-hydroxycyclohexyl-isopropyl)-cyclohexane, 1,3-bis(p-hydroxycyclohexyl-isopropyl)-cyclohexane and the like.

Another preferable group of such dihydric polycyclic alcohols are the compounds having the following general formula (4-3):

$$HO-R_2-A_1-(R_1)_j-A_2-R_3-OH \quad (4-3)$$

wherein: $A_1$, $A_2$, $R_1$, $R_2$, $R_3$, j have the same significance as defined for the general formula (4).

Examples of such dihydric polycyclic alcohols are substituted or nonsubstituted dihydroxyalkylbicycloalkanes, such as 4,4'-dihydroxymethylbicyclohexane, and substituted or unsubstituted bis(hydroxyalkylcycloalkyl)alkanes, such as 1,2-bis(4-hydroxymethylcyclohexyl)ethane, 2,2-bis(4-hydroxymethylcyclohexyl)propane, 2,3-bis(4-hydroxymethylcyclohexyl)butane, 2,3-dimethyl-2,3-bis-(4-hydroxymethylcyclohexyl)butane and the like.

The polyhydroxyl compound (G) here is a compound which is obtained by reacting the above-mentioned polyhydric alcohols (F) having at least one alicyclic ring with an alkylene oxide in the presence of such catalysts as will accelerate the reaction of the OH group and the epoxy group and which has atomic groups —ROH (wherein R is an alkylene group derived from an alkylene oxide) and/or —(RO)$_n$H (wherein R is an alkylene group derived from an alkylene oxide, such that one polyoxyalkylene chain may contain different alkylene groups, and n is an interger of 2 or more showing the polymerized number of oxyalkylene groups) bonded with said phenol residue by an ether bond. In this case, the ratio of alkylene oxide to said polyhydric alcohols (F) is made more than 1:1 (mol:mol). But, preferably, the ratio of the alkylene oxide to the OH group of said polyhydric alcohol (F) is 1 to 10:1 or particularly 1 to 3:1 by equivalents. Said alkylene oxides include, for example, ethylene oxide, propylene oxide and butylene oxide, and particularly preferred are those which will bring forth branched chains when producing ether linkages by their reaction with polyhydric phenols. Preferable examples thereof include propylene oxide and 2,3-butylene oxide, and a particularly preferable example thereof is propylene oxide.

A particularly preferable group among the polyhydroxyl compounds (G) is the compounds having the following general formula:

$$H(OR)_{n1}O-A_1-(R_1)_j-A_2-O(RO)_{n2}H$$

wherein $A_1$, $A_2$, j and $R_1$ have the same significance as defined for the general formula (4-1), R is an alkylene group containing 2 to 4 carbon atoms, and $n_1$ and $n_2$ range from 1 to 3.

In addition, a preferable group among the polyhydroxyl compounds (G) is the compounds having the following general formula:

$$H(OR)_{n1}O-A_1-(R_1)_j-A_2-(R_1)_j-O(RO)_{n2}H$$

wherein $A_1$, $A_2$, j and $R_1$ have the same significance as defined for the general formula (4-2), R is an alkylene group containing 2 to 4 carbon atoms, and $n_1$ and $n_2$ range from 1 to 3.

A particularly preferable group among the polyhydroxyl mono- or polynuclear alcohols (F) is alcohols having one or two cyclohexane-rings as an alicyclic ring, 2,2-bis-(4-hydroxycyclohexyl)-propane.

The epihalohydrin (e) is represented by the following general formula (5):

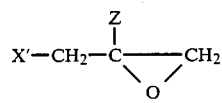
(5)

wherein Z represents a hydrogen atom, a methyl group or an ethyl group, and X' represents a halogen atom.

Examples of epihalohydrins (e) include, for example, epichlorohydrin, epibromohydrin, 1,2-epoxy-2-methyl-3-chloropropane, 1,2-epoxy-2-ethyl-3-chloropropane.

Examples of acid catalysts which can be used for accelerating the reaction of epihalohydrins (e) with polyhydric phenols (D), polyhydroxyl compounds (E), polyhydric alcohols (F) or polyhydroxyl compounds (G) include, for example, Lewis acids such as boron trifluoride, stannic chloride, zinc chloride and ferric chloride, active derivatives of Lewis acid such as boron trifluoride etherate and mixtures thereof.

Examples of basic catalysts which can be used for accelerating the reaction of epihalohydrins (e) with polyhydric phenols (D), polyhydric alcohols (F) or polyhydroxyl compounds (G) include, for example, alkali metal hydroxides such as sodium hydroxide, alkali metal alcoholates such as sodium ethylate, tertiary amines such as triethyl amine and triethanol amine, quaternary ammonium compounds such as tetramethylammonium bromide, and mixtures of them.

Examples of basic compounds which can be used for preparing glycidyl ethers at the same time as epihalohydrins (e) react with polyhydric phenols (D), polyhydric alcohols (F) or polyhydroxyl compounds (G), or for preparing glycidyl ethers by dehydrohalogenating halohydrin ethers obtained by reacting epihalohydrins (e) with polyhydric phenols (D) include, for example, alkali metal hydroxides such as sodium hydroxide, alkali metal aluminates such as sodium aluminate, and the like.

These catalysts or basic compounds can be used as they are or in the form of solutions in suitable inorganic and/or organic solvents.

The acid catalysts have a large catalytic effect among the catalysts which can be used for accelerating the reaction of epihalohydrins (e) with polyhydric phenols (D), polyhydroxyl compounds (E), polyhydric alconols (F) or polyhydroxy compounds (G).

Further, polyglycidyl ethers obtained by the reaction of epihalohydrins and a mixture of the above-mentioned polyhydric alcohols, can be used as epoxy compounds of the present invention.

Examples of epoxidized poly-unsaturated compounds (I-4), include, for example, epoxidized polybutadiene (called oxiron), vinylcyclohexenedioxide, limonenedioxide, dicyclopentadienedioxide, bis(3,4-epoxy-cyclohexylmethyl)phthalate, diethyleneglycol-bis(3,4-epoxy-cyclohexene carboxylate), 3,4-epoxy-6-methyl-cyclohexylmethyl-3,4-epoxy-6-methylcyclohexane carboxylate, 3,4-epoxy-hexahydrobenzal-3,4 nonsubstituted 1,1-dimethanol and ethyleneglycol-bis(3,4-epoxy-tetrahydrodicyclopentadien-8-yl)-ether.

Further, well known epoxy resins which contain adjacent epoxy groups, for example, various epoxy resins disclosed in various literatures, such as "Production and Use of Epoxy Resins" (edited by Hiroshi Kakiuchi), pubished by Shokodo, Tokyo (1970), can be used.

Examples of the amino compounds (1) of the general formula:

(6)

wherein $R_1$ and $R_2$ represent each an alkyl group having 1 to 5 carbon atoms and X represents an alkylene group having 1 to 5 carbon atoms, used in forming the curing agent or curing accelerator (II) which is an indispensable constituent of the composition of the present invention include dimethylaminopropylamine, diethylaminopropylamine, dipropylaminopropylamine, dibutylaminopropylamine, dimethylaminoethylamine, diethylaminoethylamine, dipropylaminoethylamine and dibutylaminoethylamine. Among them, dimethylaminopropylamine and diethylaminopropylanine are preferred.

The composition of the present invention can be prepared by using the above-mentioned compound (1) alone or a mixture thereof with 1-amino-4-ethylpiperazine (2).

The amino compound mixture [(1)+(2)] comprises the amino compound (1) and 1-amino-4-ethylpiperazine (2) in a weight ratio of 70/30 to 99/1. When the amount of the amino compound (1) is below said range, the obtained cured product becomes brittle and has insufficient physical properties.

The amino compound mixture is preferred to the amino compound (1) from the viewpoint of curing acceleration.

The preferred weight ratio of the amino compound (1) to 1-amino-4-ethylpiperazine (2) is in the range of 80/20 to 97/3.

The epoxy resins (3) having more than one adjacent epoxy groups on the average in the molecule used in forming the amine/epoxy adduct (a) according to the present invention include the above-mentioned epoxy resins (I) or mixtures of them with monoepoxy compounds. Examples of the monoepoxy compounds include butyl glycidyl ether, phenyl glycidyl ether, p-tert-butylphenyl ether, sec-butylphenyl glycidyl ether, glycidyl methacrylate and Cardura E (trade name of Yuka Shell Co., Ltd.). The monoepoxy compounds are effective in lowering the softening point, and increasing the flexibility and adhesiveness.

The amine/epoxy adduct (a) according to the present invention is obtained by reacting the amino compound (1) or the amino compound mixture [(1) and (2)] with the epoxy resin (3) in such a ratio that 0.8 to 2.5 equivalents, preferably 1.0 to 1.6 equivalents, of epoxy groups will be used per equivalent of the amino groups in the amino compound(s). When the amount of the epoxy groups is below said range, the storage stability of the product is reduced seriously and, on the contrary, when it exceeds said range, gelation occurs in the course of the addition reaction. When 1.6 to 2.5 equivalents of the epoxy groups are used per equivalent of the amino group, it is preferred to use also the above-mentioned monoepoxy compound so as to prevent gelation in the course of the addition reaction. When the secondary amino group is left to remain by controlling the reaction ratio, the adhesiveness and heat resistance are improved.

The reaction of the amino compound (1) or the mixture of the amino compounds (1) and (2) with the epoxy resin (3) is carried out, if necessary after mixing the amino compound (1) with 1-amino-4-ethylpiperazine (2). To obtain the same effects as that obtained by using the amino compound mixture, an amine/epoxy adduct obtained from the amino compound (1) and the epoxy resin (3) may be mixed with an amine/epoxy adduct obtained from 1-amino-4-ethylpiperazine (2) and the epoxy resin (3).

The epoxy addition reaction carried out for forming the amine/epoxy adduct (a) according to the present invention is carried out at 50° to 180° C., preferably 60° to 120° C., for several hours. The reaction is carried out in the absence of any solvent or in a solvent such as toluene, xylene, isopropyl alcohol (IPA), butanol, ethanol, dimethylformamide (DMF), methyl ethyl ketone (MEK) or a mixture of them.

Examples of the phenolic resins and polyhydric phenolic compounds (b) used in the present invention include phenolic resins synthesized from phenols and aldheydes (such as phenol/formalin resin, cresol/formalin resin, bisphenol A (BPA)/formalin resin, bisphenol F (BPF)/formalin resin, alkylphenol/formalin resins and mixtures of them; and particularly preferably, phenol and cresol novolac resins) and polyhydric phenol compounds (such as bisphenol A, bisphenol F and resorcinol).

The amount of the phenolic resin or polyhydric phenol compound (b) is preferably 0.1 to 0.8 part by weight, particularly 0.2 to 0.6 part by weight, per part by weight of the amine/epoxy adduct (a).

When the amount of said compound (b) is less than 0.1 part by weight, the storage stability of the composition is quite poor and, on the contrary, when it exceeds 0.8 part by weight, the compatibility, curability and physical properties are reduced unfavorably.

The reaction of the amine/epoxy adduct (a) with the phenolic resin or polyhydric phenol (b) is carried out at a temperature of 80° to 200° C. for 1 to 5 h and the obtained reaction product has a softening point of preferably 60° to 120° C.

The curing epoxy resin composition of the present invention comprises preferably 100 parts by weight of the epoxy resin (I) and 0.3 to 50 parts by weight of the curing agent or curing accelerator (II).

The curable epoxy resin composition of the present be used in combination with an ordinary latent curing agent such as acid anhydrides, dicyanamide, melamine, hydrazides, imidazoles and guanamines.

Examples of the acid anhydride curing agents include methyltetrahydrophthalic (methyl THPA), methylhexahydrophthalic (methyl HHPA), phthalic, tetrahydrophthalic, hexahydrophthalic, nadic, methylnadic, succinic, trimellitic, pyromellitic, 3,3',4,4'-benzophenonetetracarboxylic, tetrabromophthalic, chlorendic, 5-(2,5-dihydroxytetrahydrofuryl)-3-methyl-3-cyclohexene-1,2,-dicarboxylic, 3,4-dimethyl-6-(2-methyl-1-propenyl)-3,4,5,6-tetrahydrophthalic and 3,4-dimethyl-6-(2-methyl-1-propenyl)-1,2,3,6-tetrahydrophthalic anhydrides as well as trimellitic acid dimer.

The curable polyepoxide composition of the present invention may contain, if necessary, other additives. Examples of the additives include alumina, silica, silica powder, bituminous materials, cellulose, glass fiber, clay, mica, aluminum powder, aerosil, talc, bentonite, calcium carbonate and their analogs.

An effect of the present invention is that the curing epoxy resin composition of one pack type having a high compatibility with an ordinary epoxy resin and an excellent storage stability and curable at a relatively low temperature in a short time is provided as proved by the excellent curability described above.

Another effect of the present invention is that the curing epoxy resin composition capable of forming a cured product having excellent mechanical strength, adhesiveness and water resistance is provided.

Still another effect of the present invention is that the curing epoxy resin composition having controllable, well-balanced compatibility, adhesiveness, peeling strength and storage stability is provided.

The following examples will further illustrate the present invention.

EXAMPLE 1

220 g of Adeka Resin EP-4100 (epoxy resin obtained from bisphenol A and epichlorohydrin and having an epoxy equivalent of 190 and viscosity of 100 P at 25° C.) was added in portions to 130 g of diethylaminopropylamine (DEAPA) to carry out the addition reaction of amino group/epoxy group at 100° C. for 3 h and then at 120° C. for 1 h while heat generation was controlled to obtain a reaction product (A-1).

A phenolic novolac (B-1) having a softening point of about 100° C. was obtained from 650 g of phenol, 585 g of formalin (30%), 3.3 g of oxalic acid and 23 g of 15% hydrochloric acid by a known process for the production of phenolic resin.

The phenolic novolac (B-1) was added to the above reaction product (A-1) in a ratio given in the following table and a melt masking reaction was carried out at 150° C. for 2 h to obtain the following latent epoxy curing agent.

| Curing agent | II-1 | II-2 | II-3 | II-4 (Comp. Ex.) | II-5 |
|---|---|---|---|---|---|
| (A-1) | 20 | 20 | 20 | 20 | 20 |
| (B-1) | 6 | 8 | 10 | — | 5 |
| Nikanol P-100 (xylene resin of Mitsubishi Gas Chemical Co., Ltd.) | — | — | — | — | 5 |

The latent curing agent obtained as above was finely pulverized and mixed with the epoxy resin in a ratio shown below to obtain a curing epoxy resin composition of one pack type. The gelation time and storage stability of the composition and tensile shear strength of the cured product were determined to obtain the results shown in Table 1.

TABLE 1

| | (parts by weight) | | | | |
|---|---|---|---|---|---|
| EP-4100 | 100 | 100 | 100 | 100 | 100 |
| II-1 | 25 | — | — | — | — |
| II-2 | — | 25 | — | — | — |
| II-3 | — | — | 25 | — | — |
| II-4 (Comp. Ex.) | — | — | — | 20 | — |
| II-5 | — | — | — | — | 25 |
| Gelation time at 90° C. (min) | 7 | 9 | 12 | 6 | 9 |
| Storage stability (day) (40° C.) | 14 | >20 | >20 | 1 | 7 |
| Tensile shear strength of the product cured at 110° C. for 30 min (Fe/Fe) (kg/cm$^2$) | 116 | 121 | 125 | 110 | 126 |

EXAMPLE 2

252 g of Adeka Resin EP-4100, 16 g of PGE (phenyl glycidyl ether), 70 g of toluene and 70 g of IPA were added to 132 g of DEAPA and the addition reaction was carried out at 80° to 90° C. for 4 h while the solvent was refluxed. Then, toluene and IPA were distilled out. After thorough distillation of the solvent, a reaction product (A-2) was obtained. This reaction product was mixed with the phenoic novolac (B-1) obtained in Example 1 or bisphenol F in a ratio shown in the following table and a melt masking reaction was carried out at 150° C. for 3 h.

| Curing agent | II-6 | II-7 | II-8 | II-9 (Comp. Ex.) | II-10 |
|---|---|---|---|---|---|
| (A-2) | 20 | 20 | 20 | 20 | 20 |
| (B-1) | 3 | 5 | 8 | — | — |
| BPF (bisphenol F) | — | — | — | — | 8 |

The latent curing agent obtained as above was finely pulverized and mixed with the epoxy resin (EP-4100) in a ratio shown below to obtain a curing epoxy resin composition of one pack type. The gelation time and storage stability of the composition and tensile shear strength of the cured product are shown in Table 2.

TABLE 2

| | (parts by weight) | | | | |
|---|---|---|---|---|---|
| EP-4100 | 100 | 100 | 100 | 100 | 100 |
| II-6 | 25 | — | — | — | — |
| II-7 | — | 25 | — | — | — |
| II-8 | — | — | 25 | — | — |
| II-9 | — | — | — | 25 | — |
| II-10 | — | — | — | — | 25 |
| Gelation time at 90° C. (min) | 13 | 14 | 15 | 9 | 12 |
| Storage stability (day) (40° C.) | 20 | >30 | >30 | 1 | 20 |
| Tensile shear strength of the product cured at 110° C. for 30 min. (Fe/Fe) (kg/cm$^2$) | 121 | 136 | 128 | — | 106 |

EXAMPLE 3

640 g of Adeka Resin EP-5100-75 X [epoxy resin obtained from bisphenol A and epichlorohydrin and having a solid content of 75% and epoxy equivalent (in terms of solid) of 470], 99 g of PGE and 45 g of IPA were added to 130 g of DEAPA to carry out the reaction at 80° to 85° C. for 3 h while the solvent was refluxed. Then, the solvent was distilled out to obtain a reaction product (A-3). The reaction product (A-3) was mixed with the phenolic novolac (B-1) obtained in Example 1 in a ratio shown in the following table and the melt masking reaction was carried out at 150° C. for 3 h.

| Curing agent | II-11 | II-12 | II-13 | II-14 (Comp. Ex.) |
|---|---|---|---|---|
| (A-3) | 20 | 20 | 20 | 20 |
| (B-1) | 5 | 7 | 9 | 1 |

The latent curing agent obtained as above was finely pulverized and mixed with the epoxy resin in a ratio shown below to obtain a curing epoxy resin composition of one pack type. The gelation time and storge stability of the composition and tensile shear strength of the cured product are shown in Table 3.

TABLE 3

| | (parts by weight) | | | |
|---|---|---|---|---|
| EP-4100 | 100 | 100 | 100 | 100 |
| II-11 | 30 | — | — | — |
| II-12 | — | 30 | — | — |
| II-13 | — | — | 30 | — |
| II-14 | — | — | — | 25 |
| Gelation time at 90° C. (min) | 15 | 17 | 18 | 17 |
| Storage stability (day) (40° C.) | 5 | 14 | 30 | 1 |
| Tensile shear strength of the product cured at 120° C. for 30 min Fe/Fe (kg/cm$^2$) | 135 | 136 | 140 | — |

EXAMPLE 4

30 g of dimethylaminopropylamine, 61 g of Adeka Resin EP-4100, 10 g of toluene and 10 g of IPA were mixed together and the reaction was carried out at 85° C. for 3 h while the solvent was refluxed. The solvent was removed to obtain a reaction product (A-4). The reaction product (A-4) was mixed with the phenolic novolak (B-1) obtained in Example 1 in a ratio shown in the following table and the melt reaction was carried out by heating to 150° C. for 3 h.

| Curing agent | II-15 | II-16 |
|---|---|---|
| (A-4) | 20 | 20 |
| (B-1) | 10 | 12 |

The latent curing agent obtained as above was finely pulverized and mixed with the epoxy resin in a ratio shown below to obtain a curing epoxy resin composition of one pack type. The gelation time and storage stability of the composition and tensile shear strength of the cured product are shown in Table 4.

TABLE 4

|  | (parts by weight) | |
|---|---|---|
| EP-4900* | 100 | 100 |
| II-15 | 25 | — |
| II-16 | — | 25 |
| Storage stability (day) (40° C.) | 15 | 30 |
| Gelation time at 90° C. (min) | 13 | 15 |
| Tensile shear strength of the product cured at 100° C. for 30 min (kg/cm$^2$) (Fe/Fe) | 119 | 136 |

*bisphenol F type epoxy resin having an epoxy equivalent of 185 and viscosity of 36 P.

EXAMPLE 5

252 g of Adeka Resin EP-4100 having an epoxy equivalent of 190 and a viscosity of 100 P at 25° C. obtained from bisphenol A and epichlorohydrin, 16 g of phenyl glycidyl ether, 70 g of toluene and 70 g of IPA were added to 132 g of DEAPA and the addition reaction was carried out in the solvent at 80° to 90° C. for 4 h. Then, toluene and IPA were distilled. After the thorough distillation of the solvent, 20 parts of an obtained adduct (A-5) and 5 parts of the phenolic novolak (B-1) were subjected to the melt masking reaction at 150° C. for 3 h to obtain a curing accelerator (II-17) of the present invention. The curing accelerator (II-17) was finely pulverized and mixed with the epoxy resins and an acid anhydride curing agent in a ratio shown in Table 5 to obtain the curing epoxy resin composition of one pack type of the present invention.

For comparison, the same procedure as above was repeated except that the curing accelerator (II-17) was replaced with trisdimethylaminomethylphenol (DMP-30) to obtain a similar composition.

The curability of the composition and the physical properties of the cured product are shown in Table 5.

TABLE 5

| Adeka Resin EP-4100 | 100 | 100 | 100 |
|---|---|---|---|
| Methyl-HHPA (Rikacid #700; a product of Shin Nippon Rika Co.) | 85 | 85 | 85 |
| Curing accelerator (II-17) | 5 | 7 | — |
| DMP-30 | — | — | 1 |
| Gelation time (min) at 110° C. | 30 | 23 | 20 |
| Pot life (days) at 40° C. | >30 | >30 | 1 |
| Curing conditions | 100° C. for 2 h and 130° C. for 7 h | | |
| Heat distortion temp. (°C.) | 120 | 122 | 126 |
| Tensile strength (kg/cm$^2$) | 672 | 656 | 701 |
| Water resistance* (%) | 0.31 | 0.30 | 0.35 |

TABLE 5-continued (immersed for 7 days)

*Change in weight after immersion in water for 7 days (the same shall apply hereinafter).

EXAMPLE 6

640 g of Adeka Resin EP-5100-75 X having a solid content of 75% and epoxy equivalent of 470 (in terms of the solid) obtained from bisphenol A and epichlorohydrin, 9 g of phenyl glycidyl ether and 45 g of IPA were added to 130 g of DEAPA and the addition reaction was carried out at 80° to 85° C. for 3 h while the solvent was refluxed. Then, IPA was distilled off. After the thorough distillation of the solvent, 20 parts of an obtained adduct (A-6) and 9 parts of the phenolic novolak (B-1) were subjected to the melt masking reaction at 150° C. for 3 h to obtain a curing accelerator (II-18) of the present invention. The curing accelerator (II-18) was finely pulverized and mixed with the epoxy resin and an acid anhydride curing agent in a ratio shown in Table 6 to obtain the curing epoxy resin composition of one pack type of the present invention.

The curability of the composition and the physical properties of the cured product are shown in Table 6.

TABLE 6

| Adeka Resin EP-4900 | 100 | 100 | |
|---|---|---|---|
| Methyl-THPA (Quinhard #200; a product of Nippon Zeon Co., Ltd.) | 85 | 85 | |
| Epikote 1004*$^1$ | | | 100 |
| Quinhard-MMS*$^2$ | | | 18 |
| Curing accelerator (II-18) | 5 | 7 | 2 |
| Pot life (40° C.) | >30 days | >30 days | —*$^3$ |
| Gelation time (110° C.) | 36 min | 30 min | (150° C.) 13 min |
| Curing conditions | 100° C. for 2 h and 130° C. for 7 h | | 150° C. for 6 h |
| Heat distortion temperature (°C.) | 120 | 119 | |
| Tensile strength (kg/cm$^2$) | 712 | 693 | |
| Water resistance (immersed for 7 days) | 0.35 | 0.36 | |
| Volume resistivity ($\Omega$/cm$^2$) at 25° C. | 6.8 × 10$^{16}$ | 5.0 × 10$^{16}$ | |
| Dielectric loss, tan $\delta$ (25° C.) 10 kHz | 0.0048 | 0.0050 | |
| Dielectric constant (25° C.) 10 kHz | 3.7 | 3.8 | |
| Glass transition temp. Tg | | | 78° C. |
| Water absorption (boiling water absorption) (6 h) | | | 4.5% |

*$^1$solid bisphenol A/epichlorohydrin epoxy resin having an epoxy equivalent of about 1000,
*$^2$a polybasic acid anhydride having an NW of 314, melting point of 195° C. and acid anhydride equivalent of 157 (a product of Nippon Zeon Co., Ltd.)
*$^3$No problem was involved in the pot life, since the epoxy resin was in solid form.

EXAMPLE 7

340 g of Adeka Resin EP-4100 (epoxy resin obtained from bisphenol A and epichlorohydrin and having an epoxy equivalent of 190 and a viscosity of 100 P at 25° C.) was added in portions to a mixture of 195 g of diethylaminopropylamine and 8 g of 1-amino-4-ethylpiperazine and the reaction was carried out at 100° C. for 3 h and then at 120° C. for 1 h while heat generation was contolled to obtain an amine/epoxy adduct (A-7).

The adduct between an amine and an epoxy compound (A-7) was mixed with the phenolic novolak (B-1) in a ratio shown below and the melt masking reaction was carried out at 150° C. for 2 h to obtain a latent curing agent.

| Curing agent | Amine/epoxy adduct (A-7) | Phenolic novolak (B-1) |
|---|---|---|
| II-19 | 20 | 6 |
| II-20 | 20 | 8 |
| II-21 | 20 | 10 |
| II-22 (Comp. Ex.) | 20 | — |

The obtained latent curing agent was finely pulverized and mixed with the epoxy resin in a ratio shown in Table 7 to obtain the epoxy resin composition of one pack type.

The gelation time and storage stability of the composition and the tensile shear strength of the cured product were determined to obtain the results shown in Table 7.

then at 120° C. for 1 h while heat generation was controlled to obtain an amine/epoxy resin adduct (A-8-2).

The amine/epoxy adduct (A-8-1), amine/epoxy adduct (A-8-2) and phenolic novolak (B-1) were mixed together in the following ratio and the melt masking reaction was carried out at 150° C. for 2 h to obtain a latent curing agent.

| Curing agent | Amine/epoxy adduct (A-8-2) | Amine/epoxy adduct (A-8-1) | Phenolic novolak (B-1) |
|---|---|---|---|
| II-23 | 18 | 2 | 8 |
| II-24 | 16 | 4 | 8 |
| II-25 (Comp. Ex.) | 12 | 8 | 8 |

In another embodiment, 167 g of EP-4100 and 16 g of Epikote 834 (a product of Yuka Shell Co. Ltd. having an epoxy equivalent of 250) were added in portions to a mixture of 62 g of diethylaminopropylamine and 31 g of 1-amino-4-ethylpiperazine and the reaction was carried out at 90° to 100° C. for 2 h while heat generation was controlled to obtain an amine/epoxy adduct (A-9). 188

TABLE 7

| Adeka Resin EP-4100 | 100 | 100 | 100 | 100 |
|---|---|---|---|---|
| Curing agent | | | | |
| II-19 | 25 | — | — | — |
| II-20 | — | 25 | — | — |
| II-21 | — | — | 25 | — |
| II-22 | — | — | — | 20 |
| Gelation time at 80° C. | 21 min 45 sec | 22 min 30 sec | 29 min 35 sec | — |
| Gelation time at 90° C. | 10 min 15 sec | 12 min 32 sec | 14 min 02 sec | 8 min 40 sec |
| Gelation time at 100° C. | 4 min 55 sec | 5 min 06 sec | 5 min 18 sec | 4 min 40 sec |
| Storage stability at 40° C. (day) | 15 | at least 20 | at least 20 | 1 |
| Tensile shear strength (cured at 100° C. for 30 min) (Fe/Fe, kg/cm$^2$) | 118 | 125 | 126 | 108 |
| Heat distortion temp. (cured at 90° C. for 30 min) (°C.) | 88 | 91 | 89 | — |
| Water absorption (weight gain %) (immersed at 50° C. for 7 days) | 0.7 | 0.8 | 0.9 | — |

EXAMPLE 8

129 g of 1-amino-4-ethylpiperazine was dissolved in 167 g of toluene and 83 g of isopropyl alcohol. 284 g of Adeka Resin EP-4100 was added in portions to the solution and the reaction was carried out at 80° to 85° C. for 2 h while heat generation was controlled. After completion of the reaction, toluene and isopropyl alcohol were distilled off to obtain an amine/epoxy adduct (A-8-1).

Separately, 203 g of diethylaminopropylamine was mixed with 340 g of Adeka Resin EP-4100 in portions and the reaction was carried out at 100° C. for 3 h and g of the phenolic novolak (B-1) was added thereto and the melt masking reaction was carried out at 150° C. for 1.5 h to obtain a latent curing agent (II-26) (weight ratio of diethylaminopropylamine to 1-amino-4-ethylpiperazine: 66.6/33.4).

The latent curing agent was finely pulverized and mixed with the epoxy resin in a ratio shown below to obtain the epoxy resin composition of one pack type.

The gelation time and storage stability of the composition and the tensile shear strength of the cured product were determined to obtain the results shown in Table 8.

TABLE 8

| Adeka Resin EP-4100 | 100 | 100 | 100 | 100 |
|---|---|---|---|---|
| Curing agent | | | | |
| II-23 | 25 | — | — | — |
| II-24 | — | 25 | — | — |
| II-25 (Comp. Ex.) | — | — | 25 | — |
| II-26 (Comp. Ex.) | — | — | — | 25 |
| Gelation time at 90° C. | 9 min 30 sec | 8 min 55 sec | 9 min 45 sec | 9 min 30 sec |
| Storage stability at 40° C. (days) | at least 20 | at least 20 | at least 20 | at least 20 |
| Tensile shear strength (cured at 100° C. for 30 min) (Fe/Fe, kg/cm$^2$) | 136 | 129 | 95 | 101 |
| Heat distortion temp. (cured at 90° C. for 30 min) (°C.) | 91 | 90 | 78 | 82 |
| Water absorption (weight gain %) | 0.7 | 0.7 | 1.0 | 1.1 |

TABLE 8-continued (immersed at 50° C. for 7 days)

It is apparent from the cases of II-25 and II-26 as described above that when the amount of 1-amino-4-ethylpiperazine exceeds the above-mentioned weight ratio of diethylaminopropylamine to 1-amino-4-ethylpiperazine of 70/30, the physical properties of the cured product are deteriorated, though the curing is accelerated.

EXAMPLE 9

105 g of diethylaminopropylamine and 18 g of 1-amino-4-ethylpiperazine were dissolved in 30 g of toluene and 30 g of isopropyl alcohol. 255 g of Adeka Resin EP-4100 was added in portions to the solution and the reaction was carried out at 80° to 85° C. for 2 h while heat generation was controlled. After completion of the reaction, toluene and isopropyl alcohol were distilled off to obtain an amine/epoxy adduct (A-10).

The amine/epoxy adduct (A-10) was mixed with the phenolic novolak (B-1) in a ratio shown below and the melt masking reaction was carried out at 150° C. for 2 h to obtain a latent curing agent.

| Curing agent | Amine/epoxy adduct (A-10) | Phenolic novolak (B-1) |
|---|---|---|
| II-27 | 20 | 6 |
| II-28 | 20 | 8 |

The latent curing agent was finely pulverized and mixed with an epoxy resin (Adeka Resin EP-4900 which was a diglycidyl ether of bisphenol F having an epoxy equivalent of 185 and a viscosity of 36 P at 25° C.) to obtain the epoxy resin composition of one pack type.

The gelation time and storage stability of the composition and the tensile shear strength of the cured product are shown in Table 9.

TABLE 9

| Adeka Resin E-4900 | 100 | 100 |
|---|---|---|
| Curing agent | | |
| II-27 | 25 | — |
| II-28 | — | 25 |
| Gelation time at 90° C. | 12 min 50 sec | 13 min 02 sec |
| Storage stability at 40° C. (day) | at least 15 | at least 20 |
| Tensile shear strength (cured at 100° C. for 30 min) (Fe/Fe, kg/cm$^2$) | 128 | 136 |
| T-peeling strength (cured at 100° C. for 30 min) (kg/inch) | 3.1 | 3.3 |
| Water absorption (weight gain %) (immersed in water) at 50° C. for 7 days) | 0.9 | 0.9 |

What is claimed is:

1. A curable epoxy resin composition containing as indispensable constituents:
   (I) an epoxy resin having more than one adjacent epoxy groups on the average in the molecule, and
   (II) a curing amount or curing-accelerating amount of a compound obtained by reacting 1 part by weight of the following amine/epoxy adduct (a) with 0.1 to 0.8 part by weight of the following compound(s) (b):
   (a) an amine/epoxy adduct (a) obtained by reacting an amino compound (1) of the general formula:

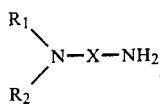

wherein $R_1$ and $R_2$ represent each an alkyl group having 1 to 5 carbon atoms and X represents an alkylene group having 1 to 5 carbon atoms,
or an amino compound mixture comprising said amino compound (1) and 1-amino-4-ethylpiperazine (2) in a weight ratio of (1) to (2) of 70/30 to 99/1, with an epoxy resin (3) having more than one adjacent epoxy groups on the average in the molecule, in such a ratio that the amount of the epoxy groups in the epoxy resin (3) is 0.8 to 2.5 equivalents per equivalent of the amino group in the amino compound(s) (1) or (1)+(2), and
   (b) at least one compound (b) selected from the group consisting of phenolic resins and polyhydric phenol compounds.

2. A curable epoxy resin composition as claimed in claim 1, in which said amine/epoxy adduct (a) is obtained from the amino compound (1) and the epoxy resin (3).

3. A curable epoxy resin composition as claimed in claim 1, in which said amine/epoxy adduct (a) is obtained from the amino compound mixture and the epoxy resin (3).

4. A curable epoxy resin composition as claimed in claim 1, which further comprises (III) an acid anhydride as a curing agent.

5. A one-pack, thermosetting, epoxy resin composition, comprising:
   (I) 100 parts by weight of an epoxy resin having two or more adjacent epoxy groups on the average in the molecule, mixed with
   (II) from 0.3 to 50 parts by weight of a material obtained by reacting, at 80° to 200° C. for 1 to 5 hours, 1 part by weight of the following amine/epoxy adduct (a) with 0.2 to 0.6 part by weight of the following material (b):
   (a) an amine/epoxy adduct (a) obtained by reacting, at 50° to 180° C., an amino compound (1) of the formula:

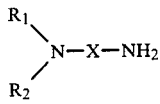

wherein $R_1$ and $R_2$ represent each an alkyl group having 1 to 5 carbon atoms and X represents an alkylene group having 1 to 5 carbon atoms,
or a mixture comprising said amino compound (1) and 1-amino-4-ethylpiperazine (2), in a weight ratio of (1) to (2) of 80/20 to 97/3, with an epoxy resin (3) having more than one adjacent epoxy groups on the average in the molecule, in such a ratio that the amount of the epoxy groups in the epoxy resin (3) is 1.0 to 1.6 equivalents per equivalent of the amino groups in the amino compound(s) (1) or (1)+(2), and (b) at least one compound (b) selected from the group consisting of phenolic resins and polyhydric phenol compounds.

6. A composition as claimed in claim 5, additionally containing an effective amount of a latent curing agent selected from the group consisting of methyltetrahydrophthalic anhydride, methylhexahydrophthalic anhydride, phthalic anhydride, tetrahydrophthalic anhydride, hexahydrophthalic anhydride, nadic anhydride, methylnadic anhydride, succinic anhydride, trimellitic anhydride, pyromellitic anhydride, 3,3', 4,4'-benzophenonetetracarboxylic anhydride, tetrabromophthalic anhydride, chlorendic anhydride, 5-(2,5-dihydroxytetrahydrofuryl)-3-methyl-3-cyclohexene-1,2-dicarboxylic anhydride, 3,4-dimethyl-6-(2-methyl-1-propenyl)-3,4,5,6-tetrahydrophthalic anhydride, 3,4-dimethyl-6-(2-methyl-1-propenyl)-1,2,3,6-tetrahydrophthalic anhydride and trimellitic acid dimer.

* * * * *